US012783468B2

(12) United States Patent
Li et al.

(10) Patent No.: US 12,783,468 B2
(45) Date of Patent: Nov. 3, 2026

(54) DATA MIGRATION METHOD AND APPARATUS, ELECTRONIC DEVICE AND STORAGE MEDIUM

(71) Applicant: IEIT SYSTEMS Co., Ltd., Jinan (CN)

(72) Inventors: Xuesheng Li, Jinan (CN); Kai Zhang, Jinan (CN); Bin Sun, Jinan (CN)

(73) Assignee: IEIT SYSTEMS Co., Ltd., Jinan (CN)

( * ) Notice: Subject to any disclaimer, the term of this patent is extended or adjusted under 35 U.S.C. 154(b) by 0 days.

(21) Appl. No.: 19/151,419

(22) PCT Filed: Feb. 8, 2024

(86) PCT No.: PCT/CN2024/076968

§ 371 (c)(1),
(2) Date: Jul. 28, 2025

(87) PCT Pub. No.: WO2024/174921

PCT Pub. Date: Aug. 29, 2024

(65) Prior Publication Data

US 2026/0119462 A1 Apr. 30, 2026

(30) Foreign Application Priority Data

Feb. 21, 2023 (CN) ........................ 202310140582.2

(51) Int. Cl.
*G06F 16/00* (2019.01)
*G06F 9/48* (2006.01)
(Continued)

(52) U.S. Cl.
CPC .......... *G06F 16/188* (2019.01); *G06F 9/4881* (2013.01); *G06F 9/5077* (2013.01);
(Continued)

(58) Field of Classification Search
CPC .. G06F 16/188; G06F 16/1824; G06F 16/172; G06F 9/4881; G06F 9/30036;
(Continued)

(56) References Cited

U.S. PATENT DOCUMENTS

| | | | | |
|---|---|---|---|---|
| 5,875,487 | A * | 2/1999 | Schwartz | G06F 12/109 711/3 |
| 6,349,355 | B1 * | 2/2002 | Draves | G06F 12/1491 711/6 |

(Continued)

FOREIGN PATENT DOCUMENTS

| | | | |
|---|---|---|---|
| CA | 2922578 C * | 3/2015 | |
| CN | 106850698 A | 6/2017 | |

(Continued)

OTHER PUBLICATIONS

Venkata Nagesh Boddapati et al., "Data migration in the cloud database A review of vendor solutions and challenges", International Journal of Computing and Artificial Intelligence 2022; 3(2): 96-101.*

(Continued)

*Primary Examiner* — Srirama Channavajjala
(74) *Attorney, Agent, or Firm* — COOPER LEGAL GROUP LLC

(57) ABSTRACT

The present application relates to the technical field of storage. Disclosed are a data migration method and apparatus, an electronic device and a non-transitory readable storage medium. The method includes: receiving a data transmission request, which is sent by a user-mode application program; dividing read-write data, which corresponds to the data transmission request, into a plurality of data sub-segments; and performing data migration on the plurality of data sub-segments between the user-mode application program and a kernel-mode cache in parallel by using a plurality of data migration threads, wherein the data migra-
(Continued)

tion threads are in a one-to-one correspondence with the data sub-segments. The present application improves the efficiency of data migration between a user mode and a kernel mode.

19 Claims, 7 Drawing Sheets

(51) Int. Cl.

| | |
|---|---|
| ***G06F 9/50*** | (2006.01) |
| ***G06F 11/00*** | (2006.01) |
| ***G06F 11/10*** | (2006.01) |
| ***G06F 11/14*** | (2006.01) |
| ***G06F 16/172*** | (2019.01) |
| ***G06F 16/182*** | (2019.01) |
| ***G06F 16/188*** | (2019.01) |

(52) U.S. Cl.
CPC ........ *G06F 9/5088* (2013.01); *G06F 11/1072* (2013.01); *G06F 11/1435* (2013.01); *G06F 16/172* (2019.01); *G06F 16/1824* (2019.01)

(58) Field of Classification Search
CPC .. G06F 9/5088; G06F 9/5077; G06F 11/1435; G06F 11/1072
See application file for complete search history.

(56) References Cited

U.S. PATENT DOCUMENTS

| | | | | |
|---|---|---|---|---|
| 8,185,901 | B2 * | 5/2012 | Barsness | G06F 11/3495 718/102 |
| 2005/0091439 | A1 * | 4/2005 | Mohideen | G06F 12/0692 711/E12.068 |
| 2008/0133615 | A1 * | 6/2008 | Bradshaw | G06F 12/0866 |
| 2011/0099319 | A1 * | 4/2011 | Mukherjee | G06F 12/1081 711/6 |
| 2013/0031374 | A1 * | 1/2013 | Thom | G06F 21/74 713/189 |
| 2013/0036285 | A1 * | 2/2013 | Ansari | H04L 69/02 711/E12.002 |
| 2014/0223166 | A1 * | 8/2014 | Wu | G06F 1/329 713/100 |
| 2014/0366030 | A1 * | 12/2014 | Solihin | G06F 9/4856 718/100 |
| 2014/0375662 | A1 * | 12/2014 | Chen | G06F 9/544 345/542 |
| 2015/0007196 | A1 * | 1/2015 | Toll | G06F 9/5088 718/105 |
| 2015/0302016 | A1 | 10/2015 | Nam et al. | |
| 2016/0253112 | A1 * | 9/2016 | Chen | G06F 11/1072 714/6.21 |
| 2017/0235612 | A1 * | 8/2017 | Chen | G06F 9/5077 718/1 |
| 2018/0052620 | A1 * | 2/2018 | Driesen | G06F 3/0617 |
| 2019/0347125 | A1 * | 11/2019 | Sankaran | G06F 9/30036 |
| 2020/0050553 | A1 * | 2/2020 | El | G06F 12/109 |
| 2023/0146364 | A1 * | 5/2023 | Cui | G06F 21/53 718/1 |

FOREIGN PATENT DOCUMENTS

| | | | |
|---|---|---|---|
| CN | 109408466 | A | 3/2019 |
| CN | 109857545 | A | 6/2019 |
| CN | 110445580 | A | 11/2019 |
| CN | 111078628 | A | 4/2020 |
| CN | 111240853 | A | 6/2020 |
| CN | 112416863 | A | 2/2021 |
| CN | 112637343 | A | 4/2021 |
| CN | 113849238 | A | 12/2021 |
| CN | 114237519 | A | 3/2022 |
| CN | 115482876 | A | 12/2022 |
| CN | 115576692 | A | 1/2023 |
| EP | 0747827 | A1 * | 12/1996 |
| EP | 3637288 | B1 * | 4/2020 |
| JP | 2012048515 | A | 3/2012 |
| JP | 2017055336 | A | 3/2017 |
| WO | WO2001002962 | A1 * | 1/2001 |
| WO | WO 2011048606 | A2 * | 4/2011 |
| WO | WO 2018/125250 | A1 * | 7/2018 |
| WO | 2022267427 | A1 | 12/2022 |

OTHER PUBLICATIONS

Bernhard Thalheim et al., "Data migration A theoretical perspective", Data & Knowledge Engineering, vol. 87, Sep. 2013, pp. 260-278.*

Sana Damani, et al."Memory access scheduling to reduce thread migrations", Proceedings of the 31st ACM SIGPLAN International Conference on Compiler Construction Mar. 2022, pp. 144-155.*

Brian A. Page et al., "The Evolution of a New Model of Computation", Nov. 2022 IEEE/ACM Workshop on Irregular Applications: Architectures and Algorithms (IA3), pp. 9-18.*

International Search Report of corresponding PCT application (PCT/CN2024/076968) Apr. 23, 2024, 7 pages.

Written Opinion of International Searching Authority of corresponding PCT application (PCT/CN2024/076968) Apr. 23, 2024, 6 pages.

First Office Action of corresponding CN priority application (CN202310140582.2) Mar. 28, 2023, 7 pages.

Notification to Grant Patent Right for Invention of corresponding CN priority application (CN202310140582.2) Apr. 19, 2023, 3 pages.

Xie changsheng, Chen Ning, WanJiguang, "Design of unified storage network date mover system and its implementation", J. Huazhong Univ. of Sci. & Tech (Nature Science Edition) , vol. 33 No. 4,Apr. 30, 2025, 4 pages with English abstract.

Qi-Fan Zhou et al., "Multi-frame Integrated Aero-engine Altitude Simulation Test Bench Data Flow Visualization Migration Technology", «2022 2nd International Conference on Computer Science, Electronic Information Engineering and Intelligent Control Technology(CEI)»,Nov. 22, 2022, 7 pages.

* cited by examiner

DATA MIGRATION METHOD AND APPARATUS, ELECTRONIC DEVICE AND STORAGE MEDIUM

CROSS-REFERENCE TO RELATED APPLICATION

This application is the national phase application of International Application No. PCT/CN2024/076968, filed Feb. 8, 2024, which claims priority to Chinese Patent Application No. 202310140582.2, filed on Feb. 21, 2023 in China National Intellectual Property Administration and entitled "Data Migration Method and Apparatus, Electronic Device and Storage Medium". The contents of International Application No. PCT/CN2024/076968 and Chinese Patent Application No. 202310140582.2 are incorporated herein by reference in their entireties.

FIELD

The present application relates to the technical field of storage, in particular to a data migration method and apparatus, an electronic device and a non-transitory readable storage medium.

BACKGROUND

Single stream is an application scenario with relatively high requirements in the field of storage, and is mainly configured for high-performance computing applications and especially for data write-in applications of satellites, five-hundred-meter aperture spherical telescopes, cryo-electron microscopes, etc. With the progressive increment of data sizes of satellites, astronomical telescopes, etc., distributed storage clients are required to be able to provide a higher receiving performance, i.e., a single-stream performance.

Generally speaking, distributed storage means that a plurality of storage nodes form a storage system by means of network interconnection to achieve a unified namespace, and the system might be accessed in parallel by means of the clients. A single distributed storage thread mainly has the performance that a file is striped and is concurrently sent to the plurality of nodes for parallel processing.

As shown in FIG. 1, FIG. 1 is a structural diagram of a data migration system in the prior art. In the prior art, for single-thread storage access in an application process, firstly, data is called to a virtual file system (VFS) interface of a kernel by means of an Application Programming Interface (API) of a standard file library, and is then called to enter a kernel-mode distributed storage client; then, data copying and data migration between a user mode and a kernel mode are achieved, and thus, applied data might be accessed by the kernel-mode client. For data migration and copying between the user mode and the kernel mode, an application program initiates system calling to enter the API of a VFS; a data address of a user-mode process is transferred to the kernel-mode distributed storage client; then, data migration is completed by means of copying functions of the user mode and the kernel mode, and the stored data is transferred from the user process to a kernel cache. After a data cache is transferred to the kernel in the user process, erasure-coded stripe computation is performed, and the data cache is stripped and is then distributed to a back-end storage system.

That is, data migration from the user mode to the kernel mode in system calling in the prior art might only be completed with a single thread, it is impossible to put all bandwidths of a memory to good use; the copying performance of a single kernel might only be put to good use; single-thread Input/Output (IO) depends on the system calling initiated by the user process and is related to a thread of a user, whereby data migration might only be performed serially, and the efficiency of data migration is relatively low. Therefore, how to improve the efficiency of data migration between the user mode and the kernel mode is a technical problem to be solved by the skilled in the art.

SUMMARY

The present application aims to provide a data migration method and apparatus, an electronic device and a computer non-transitory readable storage medium, by which the efficiency of data migration between a user mode and a kernel mode is improved.

In order to achieve the above-mentioned object, the present application provides a data migration method, including:

- receiving a data transmission request, which is sent by a user-mode application program;
- dividing read-write data, which corresponds to the data transmission request, into a plurality of data sub-segments; and
- performing data migration on the plurality of data sub-segments between the user-mode application program and a kernel-mode cache in parallel by using a plurality of data migration threads, wherein the data migration threads are in a one-to-one correspondence with the data sub-segments.

The receiving a data transmission request, which is sent by a user-mode application program, includes:

- receiving, by means of a virtual file system interface, the data transmission request, which is sent by the user-mode application program.

Before the performing data migration on the plurality of data sub-segments between the user-mode application program and a kernel-mode cache in parallel by using a plurality of data migration threads, the data migration method further includes:

- creating a data migration thread pool, wherein the data migration thread pool includes the plurality of data migration threads.

The dividing read-write data, which corresponds to the data transmission request, into a plurality of data sub-segments includes:

- dividing the read-write data, which corresponds to the data transmission request, into the plurality of data sub-segments in order based on a preset length.

The performing data migration on the plurality of data sub-segments between the user-mode application program and a kernel-mode cache in parallel by using a plurality of data migration threads includes:

- creating a plurality of corresponding data migration tasks based on address information of the plurality of data sub-segments; and
- executing the plurality of data migration tasks in parallel by using the plurality of data migration threads to achieve data migration of the plurality of data sub-segments between the user-mode application program and the kernel-mode cache.

The address information of the data sub-segments includes a memory management unit corresponding to the application program, and lengths, source addresses and destination addresses of the data sub-segments.

The executing the plurality of data migration tasks in parallel by using the plurality of data migration threads to achieve data migration of the plurality of data sub-segments between the user-mode application program and the kernel-mode cache includes:

switching the plurality of data migration threads into a user-mode address space based on the memory management unit corresponding to the application program; and performing data migration on the plurality of data sub-segments between the user-mode application program and the kernel-mode cache by using the plurality of data migration threads based on the source addresses and the destination addresses of the plurality of corresponding data sub-segments.

Before the creating a plurality of corresponding data migration tasks based on address information of the plurality of data sub-segments, the data migration method further includes:

dividing a cache of the application program into a plurality of first segments based on a preset length, and determining the source addresses of the plurality of corresponding data sub-segments based on starting addresses of the plurality of first segments; and dividing the kernel-mode cache into a plurality of second segments based on the preset length, and determining the destination addresses of the plurality of corresponding data sub-segments based on starting addresses of the plurality of second segments.

The executing the plurality of data migration tasks in parallel by using the plurality of data migration threads to achieve data migration of the plurality of data sub-segments between the user-mode application program and the kernel-mode cache includes:

executing the plurality of data migration tasks in parallel by using the plurality of data migration threads to migrate the plurality of data sub-segments from the user-mode application program to the kernel-mode cache.

Before the creating a plurality of corresponding data migration tasks based on address information of the plurality of data sub-segments, the data migration method further includes:

dividing the kernel-mode cache into a plurality of second segments based on a preset length, and determining the source addresses of the plurality of corresponding data sub-segments based on starting addresses of the plurality of second segments; and dividing a cache of the application program into a plurality of first segments based on the preset length, and determining the destination addresses of the plurality of corresponding data sub-segments based on starting addresses of the plurality of first segments.

The executing the plurality of data migration tasks in parallel by using the plurality of data migration threads to achieve data migration of the plurality of data sub-segments between the user-mode application program and the kernel-mode cache includes:

executing the plurality of data migration tasks in parallel by using the plurality of data migration threads to migrate the plurality of data sub-segments from the kernel-mode cache to the user-mode application program.

After the performing data migration on the plurality of data sub-segments between the user-mode application program and a kernel-mode cache in parallel by using a plurality of data migration threads, the data migration method further includes:

dividing migrated data into a plurality of data stripes; and performing erasure coding redundant computation on the plurality of data stripes in parallel by using a plurality of erasure coding redundant computation threads, wherein the erasure coding redundant computation threads are in one-to-one correspondence with the data stripes.

Before the performing erasure coding redundant computation on the plurality of data stripes in parallel by using a plurality of erasure coding redundant computation threads, the data migration method further includes:

creating an erasure coding redundant computation thread pool, wherein the erasure coding redundant computation thread pool includes the plurality of erasure coding redundant computation threads.

The dividing migrated data into a plurality of data stripes includes:

dividing the migrated data into the plurality of data stripes in order based on a preset length.

The performing erasure coding redundant computation on the plurality of data stripes in parallel by using a plurality of erasure coding redundant computation threads includes:

creating a plurality of corresponding erasure coding redundant computation tasks based on input cache addresses and output cache addresses of the plurality of data stripes; and performing the erasure coding redundant computation on the plurality of data stripes in parallel by using the plurality of erasure coding redundant computation threads.

Before the dividing migrated data into a plurality of data stripes, the data migration method further includes:

determining whether all the data migration threads are completed; and if all the data migration threads are completed, performing the step of dividing migrated data into a plurality of data stripes.

After the performing erasure coding redundant computation on the plurality of data stripes in parallel by using a plurality of erasure coding redundant computation threads, the data migration method further includes:

determining whether all the erasure coding redundant computation threads are completed; and if all the erasure coding redundant computation threads are completed, sending data obtained after the erasure coding redundant computation to a storage system.

In order to achieve the above-mentioned object, the present application provides a data migration apparatus, including:

a receiving module configured for receiving a data transmission request, which is sent by a user-mode application program;

a first division module configured for dividing read-write data, which corresponds to the data transmission request, into a plurality of data sub-segments; and a migration module configured for performing data migration on the plurality of data sub-segments between the user-mode application program and a kernel-mode cache in parallel by using a plurality of data migration threads, wherein the data migration threads are in a one-to-one correspondence with the data sub-segments.

In order to achieve the above-mentioned object, the present application provides an electronic device, including:

a memory configured for storing a computer program; and a processor configured for implementing steps of the above-mentioned data migration method when executing the computer program.

In order to achieve the above-mentioned object, the present application provides a computer non-transitory readable storage medium, wherein the computer non-transitory readable storage medium has a computer program stored thereon, and the computer program implements steps of the above-mentioned data migration method when executed by a processor.

It might be known from the above solution that a data migration method provided in the present application includes: receiving a data transmission request, which is sent by a user-mode application program; dividing read-write data, which corresponds to the data transmission request, into a plurality of data sub-segments; and performing data migration on the plurality of data sub-segments between the user-mode application program and a kernel-mode cache in parallel by using a plurality of data migration threads, wherein the data migration threads are in a one-to-one correspondence with the data sub-segments.

According to the data migration method provided in the present application, the read-write data needing to be migrated between the user mode and the kernel mode is divided into the plurality of data sub-segments to be distributed to the plurality of data migration threads, and the data migration is performed on the plurality of data sub-segments in parallel by using the plurality of data migration threads, whereby the efficiency of data migration between the user mode and the kernel mode is improved. The present application further discloses a data migration apparatus, an electronic device and a computer non-transitory readable storage medium, by which the above-mentioned technical effects might also be achieved.

It should be understood that the above general description and the following detailed description are only exemplary, and might not limit the present application.

BRIEF DESCRIPTION OF THE DRAWINGS

In order to describe the technical solutions in the embodiments of the present application or the prior art more clearly, drawings required to be used in the description for the embodiments or the prior art will be briefly introduced below. Apparently, the drawings in the following description only show some embodiments of the present application. Those ordinarily skilled in the art might also obtain other drawings according to the provided drawings without creative work. The drawings are provided for further understanding of the present application, and constitute one part of the description. They serve to explain the present application in conjunction with the following specific implementations, rather than to limit the present application. In the drawings.

DETAILED DESCRIPTION

The technical solutions in the embodiments of the present application will be clearly and completely described below with reference to the drawings in the embodiments of the present application. Apparently, the described embodiments are only a part of the embodiments of the present application, rather than all the embodiments. Based on the embodiments of the present application, all other embodiments obtained by those ordinarily skilled in the art without creative work shall fall within the protection scope of the present application. In addition, in the embodiments of the present application, terms such as "first" and "second" are used for distinguishing similar objects, but are unnecessarily used for describing a specific sequential or chronological order.

An embodiment of the present application provides a data migration method, by which the efficiency of data migration between a user mode and a kernel mode is improved.

Figure 1:
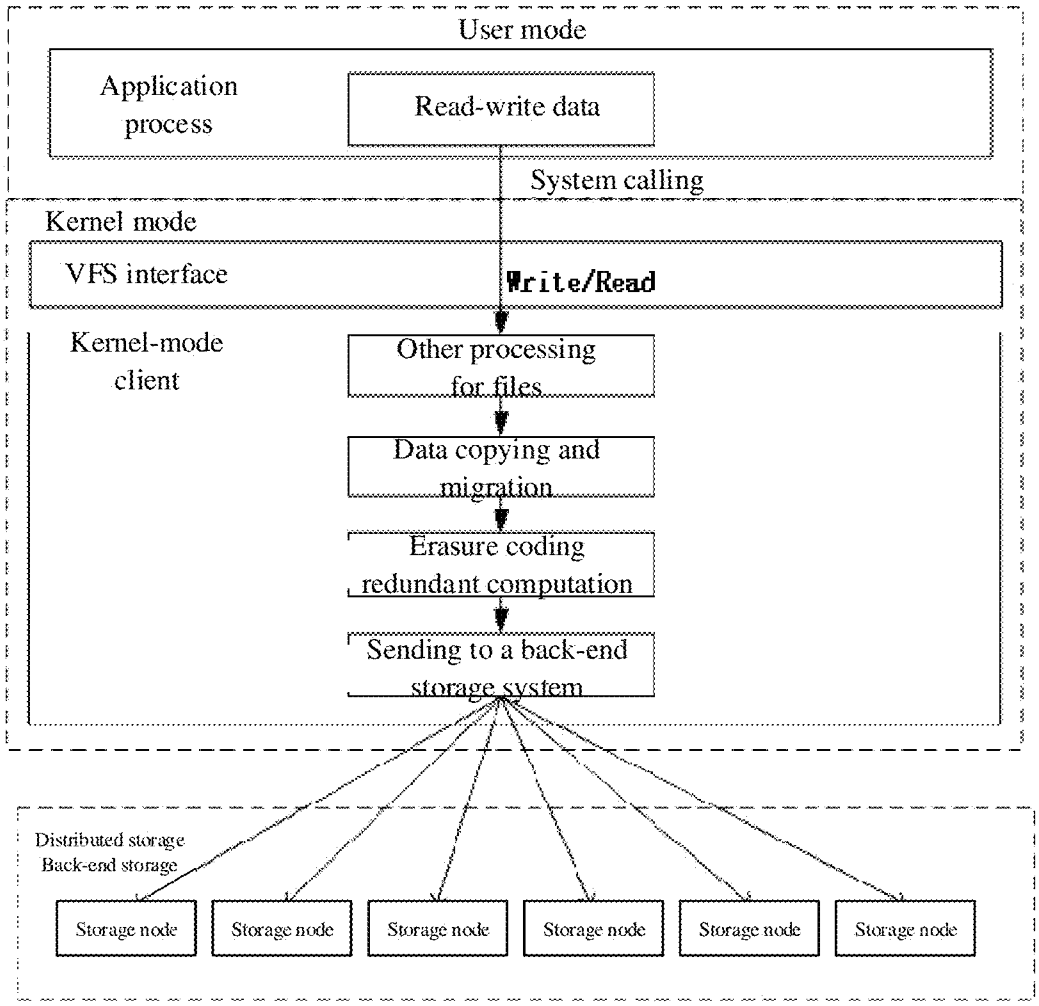
FIG. 1 is a structural diagram of a data migration system in the prior art.
Figure 2:
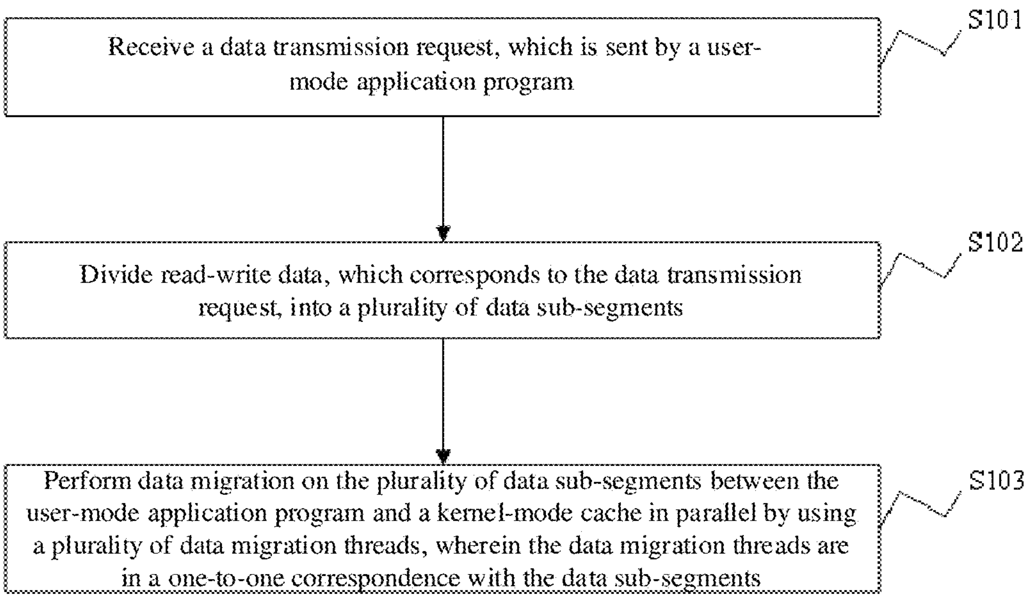
FIG. 2 is a flow diagram of a data migration method shown according to an exemplary embodiment.

Referring to FIG. 2 which is a flow diagram of a data migration method shown according to an exemplary embodiment, as shown in FIG. 2, the data migration method includes:

S101: receiving a data transmission request, which is sent by a user-mode application program.

In this embodiment, an executive body is a kernel-mode client which refers to a distributed storage client deployed in a user mode of an Operating System (OS) of a client host to achieve interconnection and access from the client host to a distributed storage system. During specific implementation, the user-mode application program initiates the data transmission request for a storage system, which is received by the kernel-mode client. A kernel mode refers to a kernel running status of a computing processor, and the kernel mode exists in Linux, Windows and other modern operating systems and is configured for running management processes, resource scheduling, memory management and other processes of the operating systems. A user mode refers to a user running status of the computing processor, and the user mode exists in Linux, Windows and other modern operating systems and is configured for running user processes.

As an optional implementation, the receiving a data transmission request, which is sent by a user-mode application program, includes: receiving, by means of a virtual file system (VFS) interface, the data transmission request, which is sent by the user-mode application program. During specific implementation, the data transmission request enters the VFS interface by means of a standard software library and system calling of the operating system. A VFS achieves a file interface of the operating system, and various file systems achieve statistic interface abutment. The VFS interface calls processing functions of a distributed file system, and alternatively, general file processing which might include processing operations for metadata, locks and other files is completed.

S102: dividing read-write data, which corresponds to the data transmission request, into a plurality of data sub-segments.

In this step, the read-write data, which corresponds to the data transmission request, is divided into the plurality of data sub-segments. As an optional implementation, the dividing read-write data, which corresponds to the data transmission request, into a plurality of data sub-segments includes: dividing the read-write data, which corresponds to the data transmission request, into the plurality of data sub-segments in order based on a preset length. During specific implementation, the read-write data is divided into the plurality of data sub-segments with the preset length in order.

S103: performing data migration on the plurality of data sub-segments between the user-mode application program and a kernel-mode cache in parallel by using a plurality of data migration threads, wherein the data migration threads are in a one-to-one correspondence with the data sub-segments.

In this step, the plurality of data sub-segments are distributed to the plurality of data migration threads, the data migration is performed on the plurality of data sub-segments in parallel by using the plurality of data migration threads, the number of the data migration threads is the same as the number of the data sub-segments, and the data migration threads are in one-to-one correspondence with the data sub-segments.

As an optional implementation, before the performing data migration on the plurality of data sub-segments between the user-mode application program and a kernel-mode cache in parallel by using a plurality of data migration threads, the data migration method further includes: creating a data migration thread pool, wherein the data migration thread pool includes the plurality of data migration threads. During specific implementation, the data migration thread pool including the plurality of data migration threads is created, and each data migration thread is configured for achieving data migration of the corresponding data sub-segments.

As an optional implementation, the performing data migration on the plurality of data sub-segments between the user-mode application program and a kernel-mode cache in parallel by using a plurality of data migration threads includes: creating a plurality of corresponding data migration tasks based on address information of the plurality of data sub-segments; and executing the plurality of data migration tasks in parallel by using the plurality of data migration threads to achieve data migration of the plurality of data sub-segments between the user-mode application program and the kernel-mode cache.

It might be understood that, in the prior art, an executed thread is still a user-mode process except that a status in which a central processing unit (CPU) is executed is switched and a data migration instruction might be used to achieve an instruction for data intermigration between the user mode and the kernel mode. In order to solve the problem that a user-mode address space might not be accessed arbitrarily by using kernel-mode threads, in this embodiment, the address information of the data sub-segments is packaged into the data migration tasks during system calling, the address information of the data sub-segments may include a Memory Management Unit (MMU) corresponding to the application program, and lengths, source addresses and destination addresses of the data sub-segments. The MMU takes charge of mapping and managing an address space and a physical memory of the user-mode process.

As an optional implementation, the executing the plurality of data migration tasks in parallel by using the plurality of data migration threads to achieve data migration of the plurality of data sub-segments between the user-mode application program and the kernel-mode cache includes: switching the plurality of data migration threads into a user-mode address space based on the memory management unit corresponding to the application program; and performing data migration on the plurality of data sub-segments between the user-mode application program and the kernel-mode cache by using the plurality of data migration threads based on the source addresses and the destination addresses of the plurality of corresponding data sub-segments.

It should be noted that memory data in the single thread in the user-mode application program might not be accessed by a plurality of threads in the kernel-mode client, that is, single-thread data might not be accessed by the plurality of threads in a default case, and therefore, in this embodiment, the space in the application program is allowed to be accessed at the same time by the plurality of threads in the kernel-mode client, i.e., the MMU, whereby the kernel-mode client might access the data in the user-mode application program.

During specific implementation, the data migration tasks are assigned to different working threads of a kernel-mode multi-thread pool. Each working thread is switched to the MMU of a designated user-mode process according to the data migration tasks, then, executes the data migration instruction according to the source addresses and the destination addresses of the segments, and returns after completing the execution to further execute the next migration task. When the data migration tasks of all segments of a cache are completed, system calling is notified to complete data migration, and the user-mode process is returned.

Data copying and migration tasks between the kernel mode and the user mode are distributed to migration working threads, the kernel-mode working threads are dynamically switched into the MMU of the user-mode process according to data copying tasks, whereby data copying and migration are achieved, and the problem that the address space of the designated user-mode process might not be accessed by the kernel-mode process is solved.

When data is copied from the user mode to the kernel mode, that is, the data transmission request in this embodiment is a write request, before the creating a plurality of corresponding data migration tasks based on address information of the plurality of data sub-segments, the data migration method further includes: dividing a cache of the application program into a plurality of first segments based on a preset length, and determining the source addresses of the plurality of corresponding data sub-segments based on starting addresses of the plurality of first segments; and dividing the kernel-mode cache into a plurality of second segments based on the preset length, and determining the destination addresses of the plurality of corresponding data sub-segments based on starting addresses of the plurality of second segments. Correspondingly, the executing the plurality of data migration tasks in parallel by using the plurality of data migration threads to achieve data migration of the plurality of data sub-segments between the user-mode application program and the kernel-mode cache includes: executing the plurality of data migration tasks in parallel by using the plurality of data migration threads to migrate the plurality of data sub-segments from the user-mode application program to the kernel-mode cache.

During specific implementation, when the data is copied from the user mode to the kernel mode, a cache of a user process is segmented into a plurality of segments according to fixed sizes (i.e., the preset length) to obtain a source address list of n segment addresses of a source starting address, and the kernel-mode cache is segmented into a plurality of segments according to the same preset length to obtain a destination address list of n segment addresses of a destination starting address; and the MMU of the user process, source starting addresses of user-mode segments, a length of a segment cache and destination addresses of kernel-mode segments form n data copying tasks to be distributed to data migration working threads.

When data is copied from the kernel mode to the user mode, that is, the data transmission request in this embodiment is a read request, before the creating a plurality of corresponding data migration tasks based on address information of the plurality of data sub-segments, the data migration method further includes: dividing the kernel-mode cache into a plurality of second segments based on a preset length, and determining the source addresses of the plurality of corresponding data sub-segments based on starting addresses of the plurality of second segments; and dividing a cache of the application program into a plurality of first segments based on the preset length, and determining the destination addresses of the plurality of corresponding data sub-segments based on starting addresses of the plurality of first segments. Correspondingly, the executing the plurality of data migration tasks in parallel by using the plurality of data migration threads to achieve data migration of the plurality of data sub-segments between the user-mode application program and the kernel-mode cache includes: executing the plurality of data migration tasks in parallel by using the plurality of data migration threads to migrate the plurality of data sub-segments from the kernel-mode cache to the user-mode application program.

During specific implementation, when the data is copied from the kernel mode to the user mode, a cache of a user process is segmented into a plurality of segments according to fixed sizes (i.e., the preset length) to obtain a source address list of n segment addresses of a destination starting address; the kernel-mode cache is segmented into a plurality of segments according to the same preset length to obtain a destination address list of n segment addresses of a source starting address; and the MMU of the user process, destination starting addresses of user-mode segments, a length of a segment cache and source addresses of kernel-mode segments form n data copying tasks to be distributed to data migration working threads.

According to the data migration method provided in the embodiment of the present application, the read-write data needing to be migrated between the user mode and the kernel mode is divided into the plurality of data sub-segments to be distributed to the plurality of data migration threads, and the data migration is performed on the plurality of data sub-segments in parallel by using the plurality of data migration threads, whereby the efficiency of data migration between the user mode and the kernel mode is improved.

Figure 3:
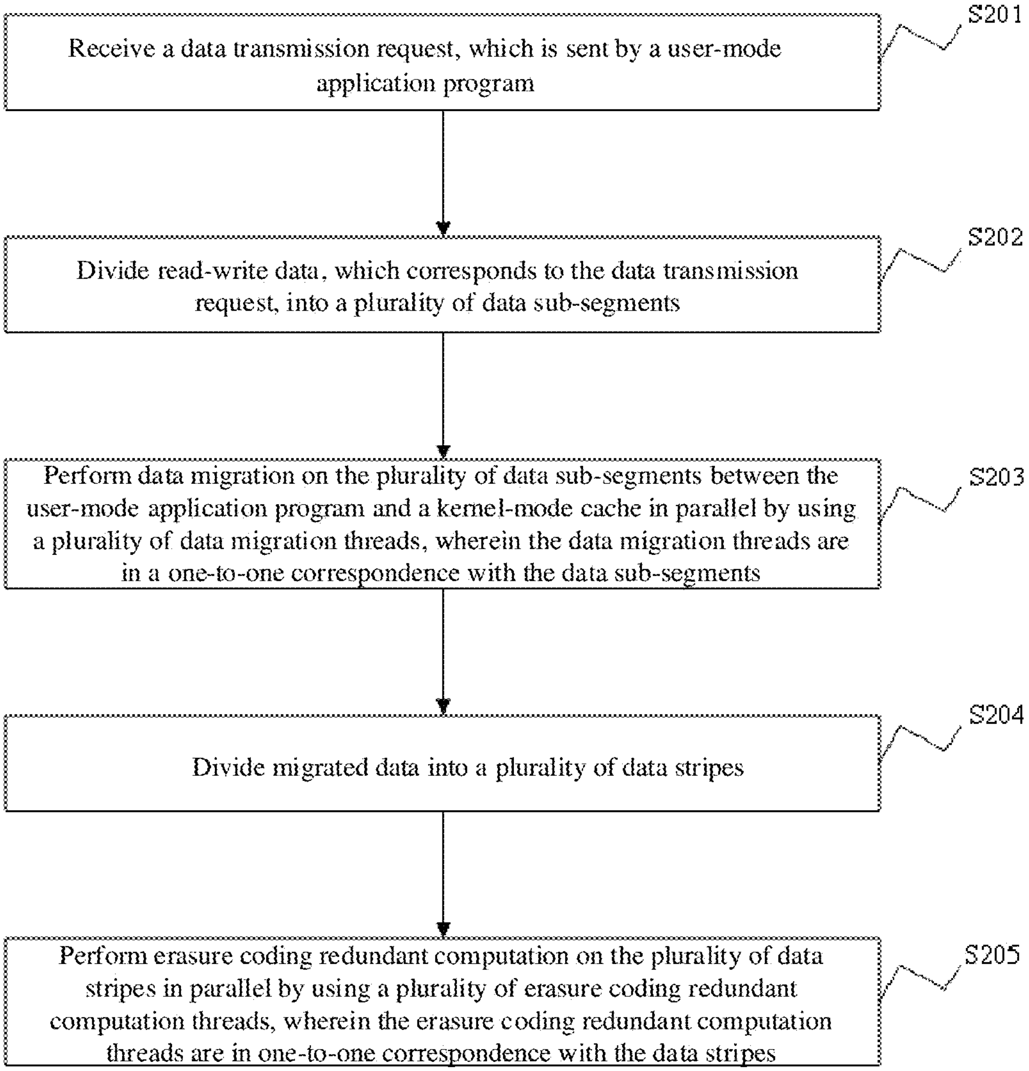
FIG. 3 is a flow diagram of another data migration method shown according to an exemplary embodiment.

An embodiment of the present application discloses a data migration method, and the technical solution is further described in this embodiment. Alternatively:

referring to FIG. 3 which is a flow diagram of another data migration method shown according to an exemplary embodiment, as shown in FIG. 3, including:

S201: receiving a data transmission request, which is sent by a user-mode application program;

S202: dividing read-write data, which corresponds to the data transmission request, into a plurality of data sub-segments;

S203: performing data migration on the plurality of data sub-segments between the user-mode application program and a kernel-mode cache in parallel by using a plurality of data migration threads, wherein the data migration threads are in a one-to-one correspondence with the data sub-segments;

during specific implementation, determining whether all the data migration threads are completed; and if all the data migration threads are completed, entering S204.

S204: dividing migrated data into a plurality of data stripes;

in this step, a data cache migrated to the kernel mode is subdivided into the plurality of data stripes. As an optional implementation, the dividing migrated data into a plurality of data stripes includes: dividing the migrated data into the plurality of data stripes in order based on a preset length. During specific implementation, the migrated data is divided into the plurality of data stripes with the preset length in order. Data striping means that a file is segmented into a plurality of small data blocks, i.e., data sub-stripes, and then, the data sub-stripes are distributed to each storage node for distributed storage.

S205: performing erasure coding redundant computation on the plurality of data stripes in parallel by using a plurality of erasure coding redundant computation threads, wherein the erasure coding redundant computation threads are in one-to-one correspondence with the data stripes.

In this step, the plurality of data stripes are distributed to the different erasure coding redundant computation threads for parallel erasure coding redundant computation, the number of the erasure coding redundant computation threads is the same as the number of the data stripes, and the erasure coding redundant computation threads are in one-to-one correspondence with the data stripes. Herein, an erasure coding (EC) computation method might be adopted. EC is a data protection method by which data is segmented into segments. Redundant data blocks are expanded and encoded and are stored on different positions, such as magnetic disks, storage nodes or other geographic positions.

As an optional implementation, before the performing erasure coding redundant computation on the plurality of data stripes in parallel by using a plurality of erasure coding redundant computation threads, the data migration method further includes: creating an erasure coding redundant computation thread pool, wherein the erasure coding redundant computation thread pool includes the plurality of erasure coding redundant computation threads. During specific implementation, the erasure coding redundant computation thread pool including the plurality of erasure coding redundant computation threads is created, and each erasure coding redundant computation thread is configured for achieving the erasure coding redundant computation of the corresponding data stripes.

As an optional implementation, the performing erasure coding redundant computation on the plurality of data stripes in parallel by using a plurality of erasure coding redundant computation threads includes: creating a plurality of corresponding erasure coding redundant computation tasks based on input cache addresses and output cache addresses of the plurality of data stripes; and performing the erasure coding redundant computation on the plurality of data stripes in parallel by using the plurality of erasure coding redundant computation threads.

During specific implementation, a data cache to be computed is segmented into m segments according to a size of the minimum block obtained by the erasure coding redundant computation to obtain m data segments and m input cache addresses; data blocks and redundancy blocks cached by the erasure coding redundant computation are divided according to the m segments to obtain m groups of output cache addresses; and the m input cache addresses and the m groups of output cache addresses sequentially form computation tasks to be distributed to the different erasure coding redundant computation threads for computation.

Each erasure coding redundant computation task is distributed to a working thread of the erasure coding redundant computation thread pool, an erasure coding redundant computation thread in the erasure coding redundant computation thread pool independently performs the erasure coding redundant computation on one of the data stripes, reads data of an input address, and performs the erasure coding redundant computation to obtain a data block and a redundancy block, and the data block and the redundancy block are outputted to a designated output result of a computation task to complete one erasure coding redundant computation task. A plurality of erasure coding task threads related to one data cache are executed in parallel, and after all the related erasure coding redundant computation tasks are completed, erasure coding computation for the entire data cache is completed.

Alternatively, after the performing erasure coding redundant computation on the plurality of data stripes in parallel by using a plurality of erasure coding redundant computation threads, the data migration method further includes: determining whether all the erasure coding redundant computation threads are completed; and if all the erasure coding redundant computation threads are completed, sending data obtained after the erasure coding redundant computation to a storage system.

Thus, it might be seen that, in this embodiment, parallel data copying and migration between the user mode and the kernel mode are achieved, the problem that the address space of the user-mode application process might not be accessed by the kernel-mode threads is solved, and the segments of the cached data are distributed to the plurality of kernel-mode threads, whereby the data migration instruction is executed concurrently. In this embodiment, the parallel erasure coding computation on the data cache is achieved, the problem of serial computation in single-thread system calling is solved, and the segments of the cached data are distributed to the plurality of kernel-mode threads, whereby an erasure coding computation instruction is executed concurrently.

Figure 4:
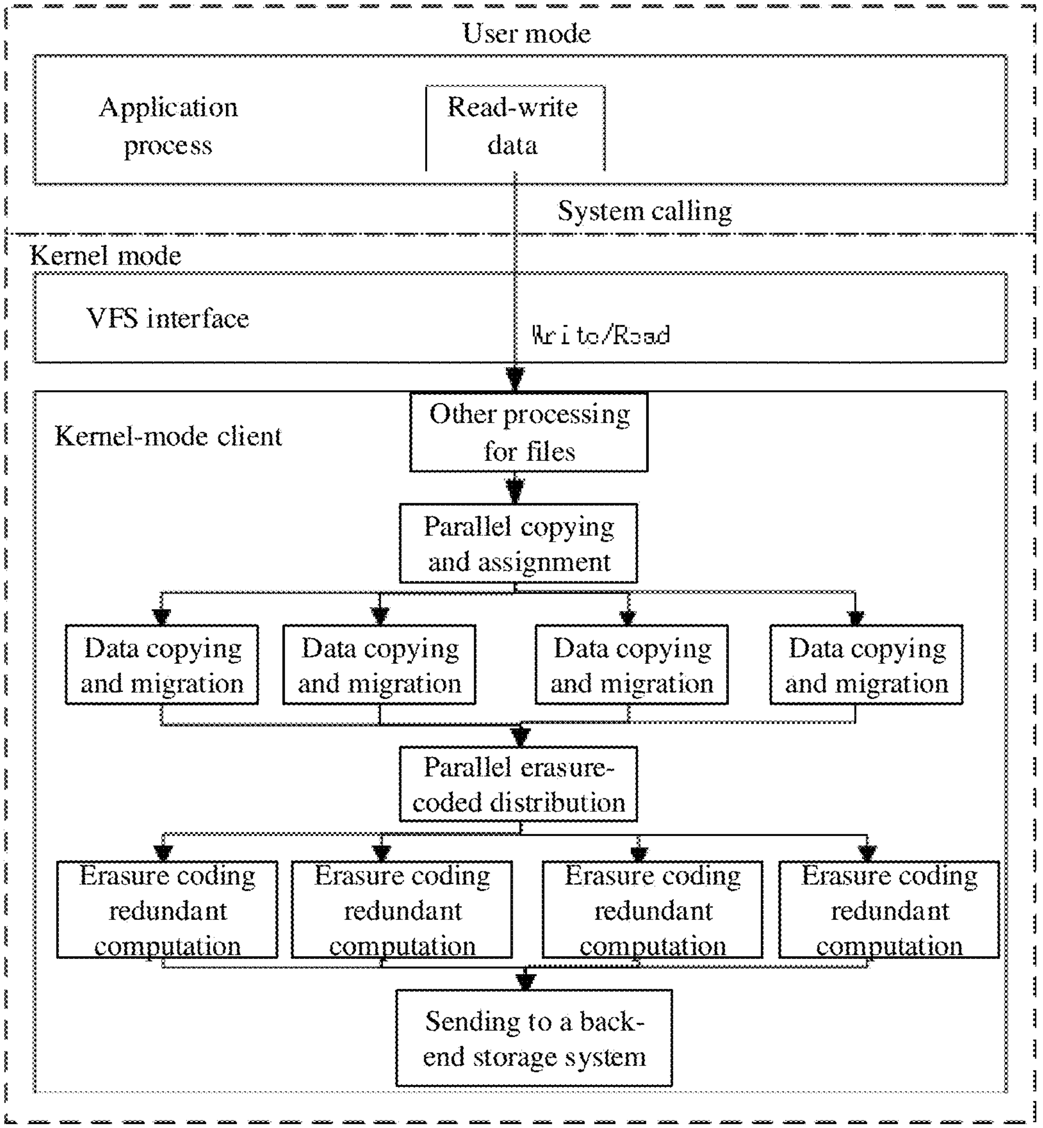
FIG. 4 is a structural diagram of a data migration system shown according to an exemplary embodiment.
Figure 5:
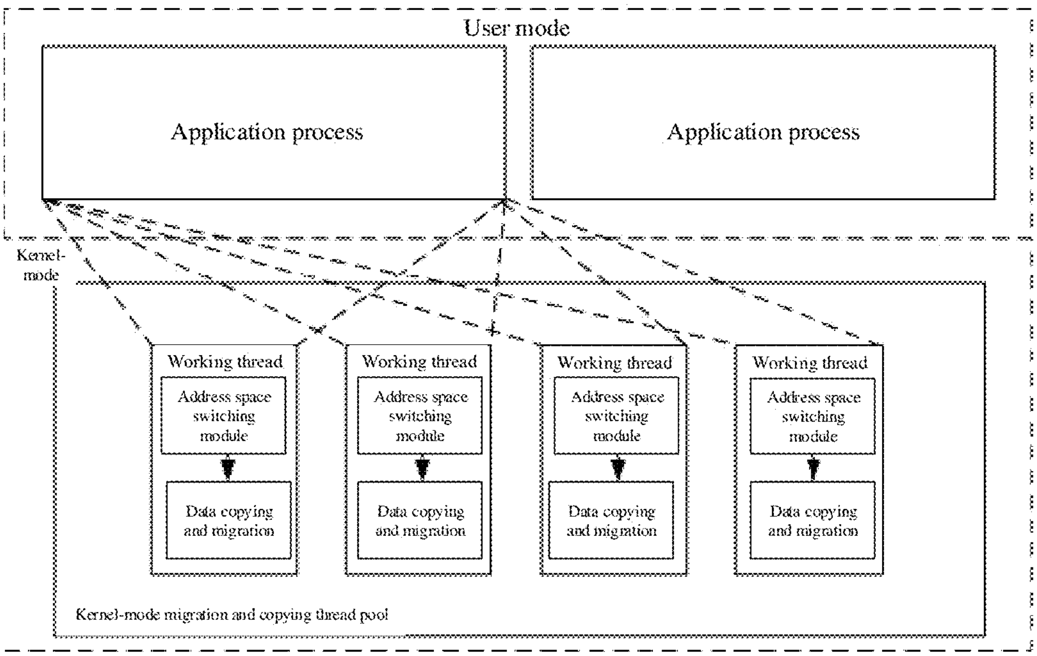
FIG. 5 is a structural diagram of another data migration system shown according to an exemplary embodiment.

An optional application embodiment provided in the present application will be introduced below. Referring to FIG. 4 which is a structural diagram of a data migration system shown according to an exemplary embodiment, as shown in FIG. 4, the data migration system includes a user mode and a kernel mode. The user mode includes an application process, and the kernel mode includes a VFS interface and a kernel-mode client. The data migration method in some embodiments includes the following steps:

step 1: initiating a data transmission request for a storage system by a user-mode application process;

step 2: entering a VFS system interface by the data transmission request by means of a standard software library and system calling of an operating system;

step 3: calling processing functions of a distributed file system by the VFS system interface;

step 4: completing general file processing, such as processing for metadata, locks, etc.;

step 5: changing serial data copying and migration into parallel data copying and migration, wherein in the prior art, a single thread of the user-mode application process is called to a distributed storage client by system calling, default data copying and migration of the system must be performed in an address space of a user-mode process, that is, address transition and copying might be performed only in a thread or process of a caller;

referring to FIG. 5 which is a structural diagram of a data migration system shown according to an exemplary embodiment, step 5 provided in this embodiment in some embodiments includes the following steps:

5.1: firstly, initializing a plurality of kernel thread pools to form a copying and migration thread pool;

5.2: dividing a user-mode data cache into a plurality of data sub-segments in order, wherein each data sub-segment is used as a copying and migration task;

5.3: assigning the copying and migration tasks to the thread pool;

5.4: switching each working thread in the kernel thread pools into a user-mode address space;

wherein kernel working threads will be switched into migration tasks from address spaces of different caller processes;

5.5: independently completing data copying and migration by each kernel working thread; and 5.6: completing data copying by all cache blocks to end the copying; and step 6: adopting parallel computation as erasure coding computation, wherein in the prior art, user application calling is single-thread calling, in this embodiment, a data cache migrated to the kernel mode is subdivided into a plurality of data stripes, each data stripe is used as a computation task to be distributed to a computation thread pool; a working thread in the thread pool independently performs computation on one of the data stripes; and specific steps are shown as follows:

6.1: firstly, initializing a plurality of kernel thread pools to form an erasure coding computation thread pool;

6.2: cutting cached data into small data blocks according to sizes of erasure-coded stripes to form computation tasks, wherein a group of computation tasks takes charge of performing erasure coding computation on one of the data blocks;

6.3: assigning the computation tasks to different working threads of the erasure coding computation thread pool; and 6.4: when a group of computation tasks of one of the data blocks is completed, completing the erasure coding computation on the entire data block.

In this embodiment, the serial data copying and migration are changed into the parallel data copying and migration, which solves the problem that data migration between the kernel mode and the user mode might not be performed in parallel; by dynamically switching a MMU of the kernel-mode client, the problem that data of a user-mode process might not be migrated in a kernel-mode thread pool is solved; and by means of segmented concurrent execution in a cache area, the problem of low single-thread erasure coding computation speed is solved, and the performance of the single thread is improved in the case that a storage client is used in an application.

A data migration apparatus provided in an embodiment of the present application will be introduced below, and reciprocal reference might be made between the data migration apparatus described hereinafter and the data migration method described above.

Figure 6:
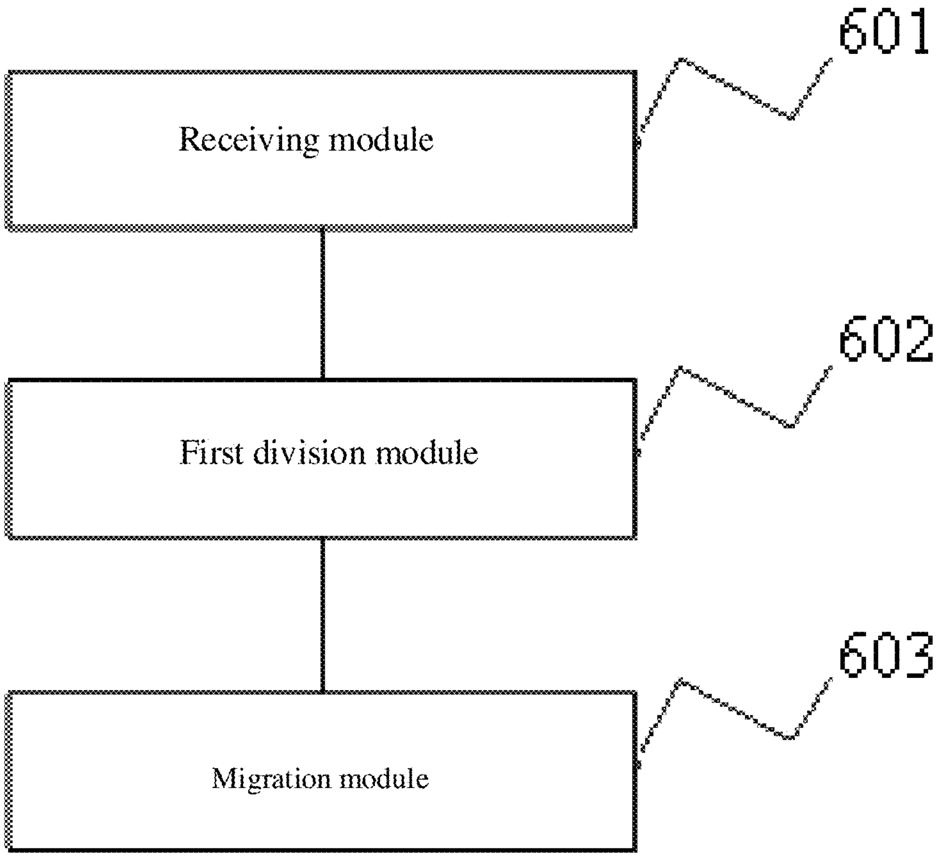
FIG. 6 is a structural diagram of a data migration apparatus shown according to an exemplary embodiment.

Referring to FIG. 6, which is a structural diagram of a data migration apparatus shown according to an exemplary embodiment, as shown in FIG. 6, including:

a receiving module 601 configured for receiving a data transmission request, which is sent by a user-mode application program;

a first division module 602 configured for dividing read-write data, which corresponds to the data transmission request, into a plurality of data sub-segments; and a migration module 603 configured for performing data migration on the plurality of data sub-segments between the user-mode application program and a kernel-mode cache in parallel by using a plurality of data migration threads, wherein the data migration threads are in a one-to-one correspondence with the data sub-segments.

According to the data migration apparatus provided in the embodiment of the present application, the read-write data needing to be migrated between the user mode and the kernel mode is divided into the plurality of data sub-segments to be distributed to the plurality of data migration threads, and the data migration is performed on the plurality of data sub-segments in parallel by using the plurality of data migration threads, whereby the efficiency of data migration between the user mode and the kernel mode is improved.

On the basis of the above-mentioned embodiment, as an optional implementation, the receiving module 601 is in some embodiments configured for receiving, by means of a virtual file system interface, the data transmission request, which is sent by the user-mode application program.

On the basis of the above-mentioned embodiment, as an optional implementation, the data migration apparatus further includes:

a first creation module configured for creating a data migration thread pool, wherein the data migration thread pool includes the plurality of data migration threads.

On the basis of the above-mentioned embodiment, as an optional implementation, the first division module 602 is in some embodiments configured for dividing the read-write data, which corresponds to the data transmission request, into the plurality of data sub-segments in order based on a preset length.

On the basis of the above-mentioned embodiment, as an optional implementation, the migration module 603 includes:

a first creation unit configured for creating a plurality of corresponding data migration tasks based on address information of the plurality of data sub-segments; and a first execution unit configured for executing the plurality of data migration tasks in parallel by using the plurality of data migration threads to achieve data migration of the plurality of data sub-segments between the user-mode application program and the kernel-mode cache.

On the basis of the above-mentioned embodiment, as an optional implementation, the address information of the data sub-segments includes a memory management unit corresponding to the application program, and lengths, source addresses and destination addresses of the data sub-segments.

On the basis of the above-mentioned embodiment, as an optional implementation, the first execution unit is in some embodiments configured for switching the plurality of data migration threads into a user-mode address space based on the memory management unit corresponding to the application program; and performing data migration on the plurality of data sub-segments between the user-mode application program and the kernel-mode cache by using the plurality of data migration threads based on the source addresses and the destination addresses of the plurality of corresponding data sub-segments.

On the basis of the above-mentioned embodiment, as an optional implementation, the migration module 603 further includes:

a first division unit configured for dividing a cache of the application program into a plurality of first segments based on a preset length, and determining the source addresses of the plurality of corresponding data sub-segments based on starting addresses of the plurality of first segments; and dividing the kernel-mode cache into a plurality of second segments based on the preset length, and determining the destination addresses of the plurality of corresponding data sub-segments based on starting addresses of the plurality of second segments.

On the basis of the above-mentioned embodiment, as an optional implementation, the first execution unit is in some embodiments configured for executing the plurality of data migration tasks in parallel by using the plurality of data migration threads to migrate the plurality of data sub-segments from the user-mode application program to the kernel-mode cache.

On the basis of the above-mentioned embodiment, as an optional implementation, the migration module 603 further includes:

a second division unit configured for dividing the kernel-mode cache into a plurality of second segments based on a preset length, and determining the source addresses of the plurality of corresponding data sub-segments based on starting addresses of the plurality of second segments; and dividing a cache of the application program into a plurality of first segments based on the preset length, and determining the destination addresses of the plurality of corresponding data sub-segments based on starting addresses of the plurality of first segments.

On the basis of the above-mentioned embodiment, as an optional implementation, the first execution unit is configured for executing the plurality of data migration tasks in parallel by using the plurality of data migration threads to migrate the plurality of data sub-segments from the kernel-mode cache to the user-mode application program.

On the basis of the above-mentioned embodiment, as an optional implementation, the data migration apparatus further includes:

a second division module configured for dividing migrated data into a plurality of data stripes; and a computation module configured for performing erasure coding redundant computation on the plurality of data stripes in parallel by using a plurality of erasure coding redundant computation threads, wherein the erasure coding redundant computation threads are in one-to-one correspondence with the data stripes.

On the basis of the above-mentioned embodiment, as an optional implementation, the data migration apparatus further includes:

a second creation module configured for creating an erasure coding redundant computation thread pool, wherein the erasure coding redundant computation thread pool includes the plurality of erasure coding redundant computation threads.

On the basis of the above-mentioned embodiment, as an optional implementation, the second division module is in some embodiments configured for dividing the migrated data into the plurality of data stripes in order based on a preset length.

On the basis of the above-mentioned embodiment, as an optional implementation, the computation module is in some embodiments configured for creating a plurality of corresponding erasure coding redundant computation tasks based on input cache addresses and output cache addresses of the plurality of data stripes; and performing the erasure coding redundant computation on the plurality of data stripes in parallel by using the plurality of erasure coding redundant computation threads.

On the basis of the above-mentioned embodiment, as an optional implementation, the data migration apparatus further includes:

a first determination module configured for determining whether all the data migration threads are completed; and if all the data migration threads are completed, initiating a work flow of the second division module.

On the basis of the above-mentioned embodiment, as an optional implementation, the data migration apparatus further includes:

a second determination module configured for determining whether all the erasure coding redundant computation threads are completed; and if all the erasure coding redundant computation threads are completed, initiating a work flow of the a sending module; and a sending module configured for sending data obtained after the erasure coding redundant computation to a storage system.

As for the apparatus in the above-mentioned embodiment, specific methods for performing operations by each module have been described in detail in the embodiment of this method so as to be no longer described in detail herein.

Figure 7:
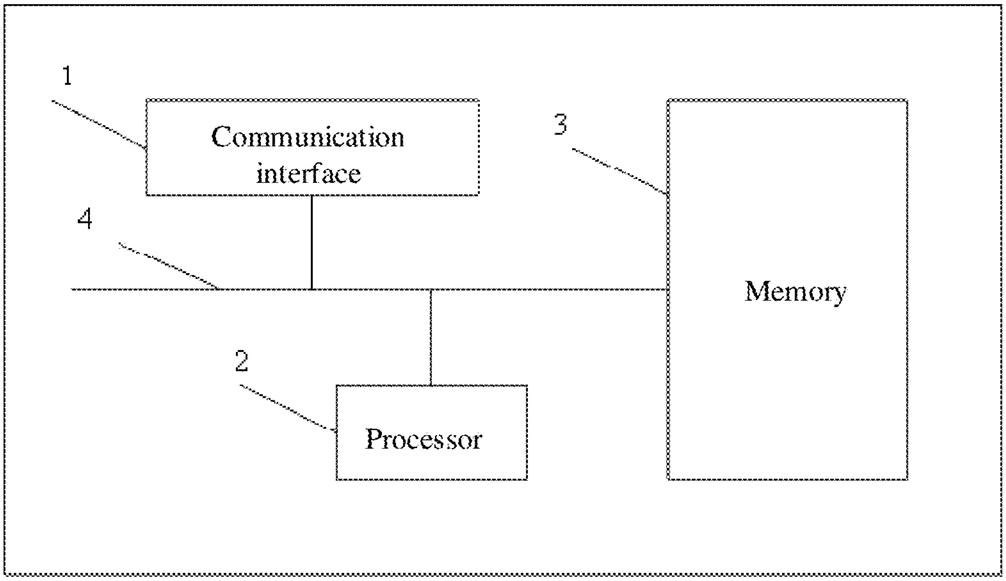
FIG. 7 is a structural diagram of an electronic device shown according to an exemplary embodiment.

Based on the hardware achievement of the above-mentioned program modules and in order to implement the method in the embodiment of the present application, an embodiment of the present application further provides an electronic device. FIG. 7 is a structural diagram of an electronic device shown according to an exemplary embodiment, as shown in FIG. 7, the electronic device includes:

a communication interface 1 capable of performing information interaction with other devices such as a network device; and a processor 2 connected with the communication interface 1 to implement information interaction with other devices, and configured for performing the data migration method provided in one or more of the above-mentioned technical solutions when a computer program runs. The computer program is stored on a memory 3.

Of course, during actual applications, all components in the electronic device are coupled together by means of a bus system 4. It might be understood that the bus system 4 is configured for implementing connection and communication among the components. In addition to a data bus, the bus system 4 further includes a power bus, a control bus and a status signal bus. However, for the sake of clarity, in FIG. 7, the various buses are marked as the bus system 4.

The memory 3 in the embodiment of the present application is configured for storing various kinds of data to support operations of the electronic device. Examples of the data include any computer program operated on the electronic device.

It might be understood that the memory 3 may be a volatile memory or a non-transitory memory, and may also include both of the volatile memory and the non-transitory memory. The non-transitory memory might be a Read Only Memory (ROM), a Programmable Read-Only Memory (PROM), an Erasable Programmable Read-Only Memory (EPROM), an Electrically Erasable Programmable Read-Only Memory (EEPROM), a ferromagnetic random access memory (FRAM), a Flash Memory, a magnetic surface memory, a compact disc or a Compact Disc Read-Only Memory (CD-ROM); and the magnetic surface memory may be a magnetic disk memory or a magnetic tape memory. The volatile memory may be a Random Access Memory (RAM) used as an external high-speed cache. By means of exemplary instead of restrictive illustration, there are available RAMs in a plurality of forms, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM) and a Direct Rambus Random Access Memory (DRRAM). The memory 3 described in the embodiment of the present application aims at including, but not limited to these and any other suitable types of memories.

The method disclosed in the above-mentioned embodiment of the present application may be applied to the processor 2 or implemented by the processor 2. The processor 2 may be an integrated circuit chip and has a signal processing capability. During implementation, each step of the above-mentioned method might be completed by an integrated logic circuit serving as hardware in the processor 2 or an instruction in a software form. The above-mentioned processor 2 may be a general-purpose processor, a Digital Signal Processor (DSP), or other programmable logic devices, a discrete gate, a transistor logic device, a discrete hardware component, etc. The processor 2 may implement or perform each method, step and logic block diagram disclosed in the embodiments of the present application. The general-purpose processor may be a microprocessor or any conventional processor, etc. The steps of the method disclosed in the embodiment of the present application might be directly embodied to be completed by a hardware decoding processor or completed by a combination of hardware and software modules in the decoding processor. The software module may be located in a non-transitory readable storage medium located in the memory 3, and the processor 2 reads a program in the memory 3 and completes the steps of the afore-mentioned method in conjunction with hardware thereof.

The processor 2, when executing the program, implements corresponding flows in each method of the embodiment of the present application. For concision, repeated description will be omitted herein.

In an exemplary embodiment, an embodiment of the present application further provides a non-transitory readable storage medium, i.e., a computer non-transitory readable storage medium, for example, it includes a memory 3 storing a computer program, and the above-mentioned computer program may be executed by a processor 2 to complete the steps of the afore-mentioned method. The computer non-transitory readable storage medium may be a memory such as an FRAM, a ROM, a PROM, an EPROM, an EEPROM, a Flash Memory, a magnetic surface memory, a compact disc and a CD-ROM.

It might be understood by those ordinarily skilled in the art that all or parts of the steps of the above-mentioned method embodiment may be completed by a program instructing relevant hardware, the afore-mentioned program may be stored in a computer non-transitory readable storage medium, and when the program is executed, the steps of the above-mentioned method embodiment are performed; and the above-mentioned non-transitory readable storage medium includes various media, such as a mobile storage device, an ROM, an RAM, a diskette or a compact disc, capable of storing program codes.

Or, if the above-mentioned integrated unit in the present application is implemented in a form of a software functional module and is sold or used as an independent product, it might also be stored in a computer non-transitory readable storage medium. Based on such understanding, essences or parts, contributing to the prior art, of the technical solutions in the embodiments of the present application can be embodied in a form of a software product, and this computer software product is stored in a non-transitory readable storage medium, and includes a plurality of instructions, whereby all or parts of the method in each embodiment of the present application are performed by one electronic device (which may be a personal computer, a server, a network device, etc.). The afore-mentioned non-transitory readable storage medium includes various media, such as a mobile storage device, a ROM, a RAM, a diskette or a compact disc, capable of storing program codes.

The above description only shows the specific implementations of the present application. However, the protection scope of the present application is not limited thereto. Any variations or replacements that might be readily envisioned by those skilled in the art with the technical scope disclosed by the present application should fall within the protection scope of the present application. Therefore, the protection scope of the present application should be subject to the protection scope defined in the claims.

What is claimed is:

1. A data migration method, comprising:

receiving a data transmission request, which is sent by a user-mode application program;

dividing read-write data, which corresponds to the data transmission request, into a plurality of data sub-segments; and performing data migration on the plurality of data sub-segments between the user-mode application program and a kernel-mode cache in parallel by using a plurality of data migration threads, wherein the plurality of data migration threads are in a one-to-one correspondence with the data sub-segments, and the performing data migration on the plurality of data sub-segments between the user-mode application program and a kernel-mode cache in parallel by using a plurality of data migration threads comprises:

creating a plurality of corresponding data migration tasks based on address information of the plurality of data sub-segments; and executing the plurality of corresponding data migration tasks in parallel by using the plurality of data migration threads to achieve data migration of the plurality of data sub-segments between the user-mode application program and the kernel-mode cache, wherein the address information of the plurality of data sub-segments comprises a memory management unit corresponding to the user-mode application program, and lengths, source addresses and destination addresses of the plurality of data sub-segments;

wherein the executing the plurality of corresponding data migration tasks in parallel by using the plurality of data migration threads to achieve data migration of the plurality of data sub-segments between the user-mode application program and the kernel-mode cache comprises:

switching the plurality of data migration threads into a user-mode address space based on the memory management unit corresponding to the user-mode application program; and performing data migration on the plurality of data sub-segments between the user-mode application program and the kernel-mode cache by using the plurality of data migration threads based on the source addresses and the destination addresses of the plurality of data sub-segments.

2. The data migration method according to claim 1, wherein the receiving a data transmission request, which is sent by a user-mode application program, comprises:

receiving, by a virtual file system interface, the data transmission request, which is sent by the user-mode application program.

3. The data migration method according to claim 2, wherein before the performing data migration on the plurality of data sub-segments between the user-mode application program and a kernel-mode cache in parallel by using a plurality of data migration threads, the data migration method further comprises:

creating a data migration thread pool, wherein the data migration thread pool comprises the plurality of data migration threads.

4. The data migration method according to claim 2, wherein the dividing read-write data, which corresponds to the data transmission request, into a plurality of data sub-segments comprises:

dividing the read-write data, which corresponds to the data transmission request, into the plurality of data sub-segments in order based on a preset length.

5. The data migration method according to claim 1, wherein before the performing data migration on the plurality of data sub-segments between the user-mode application program and a kernel-mode cache in parallel by using a plurality of data migration threads, the data migration method further comprises:

creating a data migration thread pool, wherein the data migration thread pool comprises the plurality of data migration threads.

6. The data migration method according to claim 1, wherein the dividing read-write data, which corresponds to the data transmission request, into a plurality of data sub-segments comprises:

dividing the read-write data, which corresponds to the data transmission request, into the plurality of data sub-segments in order based on a preset length.

7. The data migration method according to claim 1, wherein before the creating a plurality of corresponding data migration tasks based on address information of the plurality of data sub-segments, the data migration method further comprises:

dividing a cache of the user-mode application program into a plurality of first segments based on a preset length, and determining the source addresses of the plurality of data sub-segments based on starting addresses of the plurality of first segments; and dividing the kernel-mode cache into a plurality of second segments based on the preset length, and determining the destination addresses of the plurality of data sub-segments based on starting addresses of the plurality of second segments.

8. The data migration method according to claim 7, wherein the executing the plurality of corresponding data migration tasks in parallel by using the plurality of data migration threads to achieve data migration of the plurality of data sub-segments between the user-mode application program and the kernel-mode cache comprises:

executing the plurality of corresponding data migration tasks in parallel by using the plurality of data migration threads to migrate the plurality of data sub-segments from the user-mode application program to the kernel-mode cache.

9. The data migration method according to claim 1, wherein before the creating a plurality of corresponding data migration tasks based on address information of the plurality of data sub-segments, the data migration method further comprises:

dividing the kernel-mode cache into a plurality of second segments based on a preset length, and determining the source addresses of the plurality of data sub-segments based on starting addresses of the plurality of second segments; and dividing a cache of the user-mode application program into a plurality of first segments based on the preset length, and determining the destination addresses of the plurality of data sub-segments based on starting addresses of the plurality of first segments.

10. The data migration method according to claim 9, wherein the executing the plurality of corresponding data migration tasks in parallel by using the plurality of data migration threads to achieve data migration of the plurality of data sub-segments between the user-mode application program and the kernel-mode cache comprises:

executing the plurality of corresponding data migration tasks in parallel by using the plurality of data migration threads to migrate the plurality of data sub-segments from the kernel-mode cache to the user-mode application program.

11. The data migration method according to claim 1, wherein after the performing data migration on the plurality of data sub-segments between the user-mode application program and a kernel-mode cache in parallel by using a plurality of data migration threads, the data migration method further comprises:

dividing migrated data into a plurality of data stripes; and performing erasure coding redundant computation on the plurality of data stripes in parallel by using a plurality of erasure coding redundant computation threads, wherein the plurality of erasure coding redundant computation threads are in one-to-one correspondence with the plurality of data stripes.

12. The data migration method according to claim 11, wherein before the performing erasure coding redundant computation on the plurality of data stripes in parallel by using a plurality of erasure coding redundant computation threads, the data migration method further comprises:

creating an erasure coding redundant computation thread pool, wherein the erasure coding redundant computation thread pool comprises the plurality of erasure coding redundant computation threads.

13. The data migration method according to claim 11, wherein the dividing migrated data into a plurality of data stripes comprises:

dividing the migrated data into the plurality of data stripes in order based on a preset length.

14. The data migration method according to claim 11, wherein the performing erasure coding redundant computation on the plurality of data stripes in parallel by using a plurality of erasure coding redundant computation threads comprises:

creating a plurality of corresponding erasure coding redundant computation tasks based on input cache addresses and output cache addresses of the plurality of data stripes; and performing the erasure coding redundant computation on the plurality of data stripes in parallel by using the plurality of erasure coding redundant computation threads.

15. The data migration method according to claim 11, wherein before the dividing migrated data into a plurality of data stripes, the data migration method further comprises:

determining whether all of the plurality of data migration threads are completed; and in response to all of the plurality of data migration threads being completed, performing the dividing migrated data into a plurality of data stripes.

16. The data migration method according to claim 11, wherein after the performing erasure coding redundant computation on the plurality of data stripes in parallel by using a plurality of erasure coding redundant computation threads, the data migration method further comprises:

determining whether all of the plurality of erasure coding redundant computation threads are completed; and in response to all of the plurality of erasure coding redundant computation threads being completed, sending data obtained after the erasure coding redundant computation to a storage system.

17. The data migration method according to claim 1, wherein an executive body of the method is a kernel-mode client.

18. The data migration method according to claim 17, wherein the kernel-mode client comprises a distributed storage client, and the distributed storage client is deployed in a user mode of an Operating System (OS) of a client host to achieve interconnection and access from the client host to a distributed storage system.

19. The data migration method according to claim 1, wherein the executing the plurality of corresponding data migration tasks in parallel by using the plurality of data migration threads to achieve data migration of the plurality of data sub-segments between the user-mode application program and the kernel-mode cache comprises:

switching each data migration thread of the plurality of data migration threads to a Memory Management Unit (MMU) of a designated user-mode process according to a corresponding one of the plurality of corresponding data migration tasks; and executing data migration instructions according to the source addresses and the destination addresses.

* * * * *